(12) United States Patent
Gimeno Ferrer et al.

(10) Patent No.: US 12,175,858 B2
(45) Date of Patent: Dec. 24, 2024

(54) REACTIVE DEVICE LOCATION DETECTION AND CONFIGURATION

(71) Applicant: FORD GLOBAL TECHNOLOGIES, LLC, Dearborn, MI (US)

(72) Inventors: Daniel Gimeno Ferrer, Valencia (ES); Xose Guimil Rey, Brentwood (GB); Ignacio Navero Diaz, Brentwood (GB); Carolina Alcuson Martin, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 17/246,877

(22) Filed: May 3, 2021

(65) Prior Publication Data
US 2022/0351589 A1    Nov. 3, 2022

(51) Int. Cl.
| G08B 7/06 | (2006.01) |
| G01S 5/02 | (2010.01) |
| G08B 21/02 | (2006.01) |
| H04B 17/27 | (2015.01) |
| H04B 17/318 | (2015.01) |

(52) U.S. Cl.
CPC .............. *G08B 7/06* (2013.01); *G01S 5/0284* (2013.01); *G08B 21/02* (2013.01); *H04B 17/27* (2015.01); *H04B 17/318* (2015.01)

(58) Field of Classification Search
None
See application file for complete search history.

(56) References Cited

U.S. PATENT DOCUMENTS

| 2017/0052538 A1* | 2/2017 | Li ........................... H04W 4/48 |
| 2018/0129276 A1 | 5/2018 | Nguyen et al. |
| 2018/0225949 A1* | 8/2018 | Mowatt ................. G06F 16/951 |
| 2020/0250890 A1 | 8/2020 | Zhou et al. |
| 2020/0272124 A1* | 8/2020 | Kreuzer .................. G07C 9/38 |

FOREIGN PATENT DOCUMENTS

| JP | 2018055335 A | 4/2018 |
| WO | 2019152916 A1 | 8/2019 |

* cited by examiner

*Primary Examiner* — Adolf Dsouza
(74) *Attorney, Agent, or Firm* — Joseph Zane; Brooks Kushman P.C.

(57) ABSTRACT

A computing system receives data indicating signal strength of signals transmitted between a plurality of beacons and a mobile device. The system determines a location of the mobile device within a vehicle coordinate system, wherein the beacons have known locations within the coordinate system, the determination being based in part on the signal strength. The system also determines that the location of the mobile device is proximate to a predefined vehicle element location and instructs issuance of an alert responsive to the proximity.

16 Claims, 4 Drawing Sheets

… (1) …

REACTIVE DEVICE LOCATION DETECTION AND CONFIGURATION

TECHNICAL FIELD

The illustrative embodiments generally relate to methods and apparatuses for reactive device location detection and configuration.

BACKGROUND

Vehicles are ever more complex machines, shifting from primarily mechanical devices to much more sophisticated technology in the past 20 years. Because this has allowed for changes to configurations, and potentially complicated engine and system layouts, as well as a variety of new components and elements, it can be difficult as a repair technician, let alone a do-it-yourself user, to maintain comprehensive knowledge on how to service various different makes and models.

While the complexity of the technology has increased, the availability of information and the ease of provision has also increased. Thus, a user can often look up how to service a particular vehicle on the internet. At the same time, the user still would like to maintain primary focus on the vehicle being serviced, and so this is a helpful, but imperfect, solution, if the user has to compare a computer-displayed reference diagram (requiring a look-away) to the actual layout of the vehicle.

Further, when a vehicle breaks down and no skilled labor is available, users may find themselves forced to service a vehicle, and when the correct action is not apparently straightforward, the users may be frustrated and confused. Even a simple task like changing a tire or replacing windshield wiper fluid requires some knowledge of where elements are located—e.g., while people tend to know where the tires are, they may not know where a jack is located and they may not know which cap in the engine is for wiper fluid.

Additionally, when making mechanical adjustments, the user may not know how to proceed, and could, for example, unscrew one or more tire nuts without lifting the vehicle weight, causing damage to the wheel mount. Instructions online can be useful, but these are often frustrating tasks that may be performed at night, in the rain, on a hot day, etc., and any additional assistance that can make the task go more smoothly can be quite useful.

SUMMARY

In a first illustrative embodiment, a system includes at least one processor enabled to receive data indicating signal strength of signals transmitted between a plurality of beacons and a mobile device. The processor is further enabled to determine a location of the mobile device within a vehicle coordinate system, wherein the beacons have known locations within the coordinate system, the determination based in part on the signal strength. The processor is additionally enabled to determine that the location of the mobile device is proximate to a predefined vehicle element location and instruct issuance of an alert responsive to the proximity.

In a second illustrative embodiment, a method includes receiving data indicating signal strength of signals transmitted between a plurality of beacons and a mobile device. The method also includes determining a location of the mobile device within a vehicle coordinate system, wherein the beacons have known locations within the coordinate system, the determination based in part on the signal strength. Further, the method includes determining that the location of the mobile device is proximate to a predefined vehicle element location and instructing issuance of an alert responsive to the proximity.

In a third illustrative embodiment, a non-transitory computer-readable storage medium stores instructions that, when executed by at least one processor, enable the at least one processor to determine a location of the mobile device within a vehicle coordinate system, wherein the beacons have known locations within the coordinate system, the determination based in part on a signal strength indicated by received data indicating signal strength of signals transmitted between a plurality of beacons and a mobile device. The processor is also enabled to determine that the location of the mobile device is proximate to a predefined vehicle element location and instruct issuance of an alert responsive to the proximity.

DETAILED DESCRIPTION

Figure 1A:
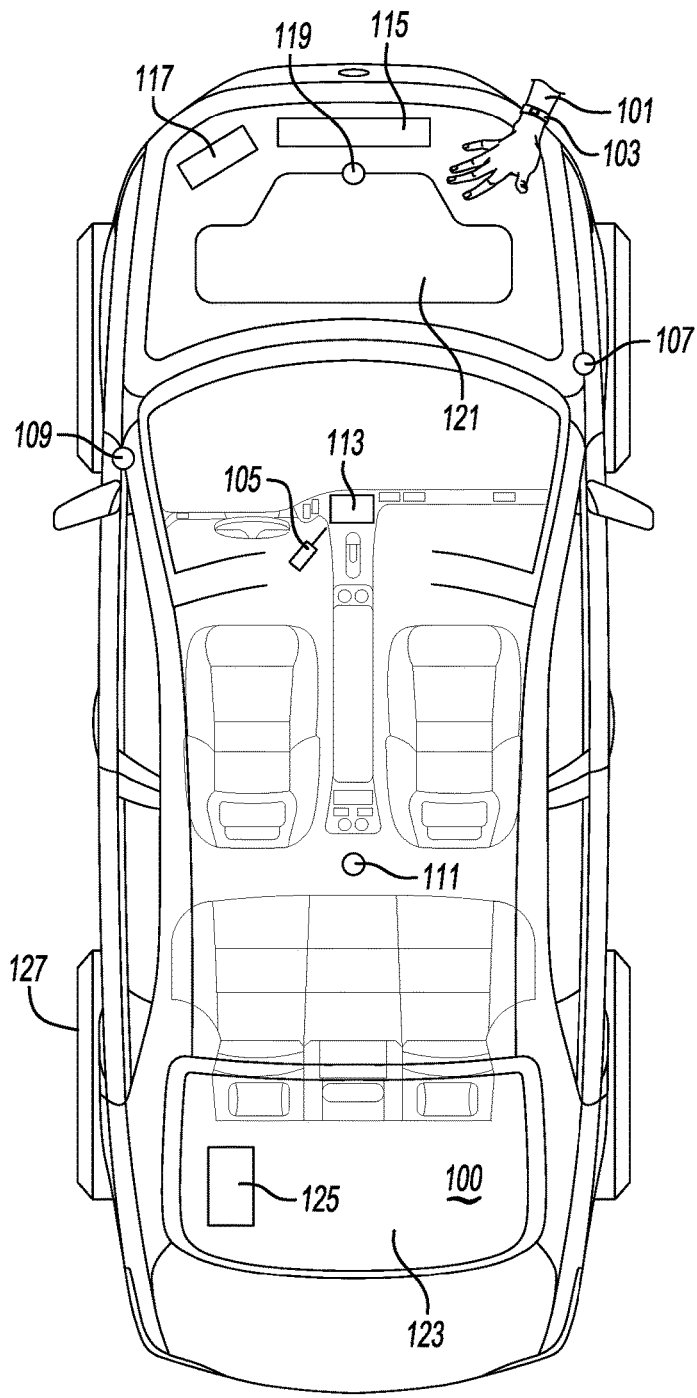
FIG. 1A shows an illustrative example of a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While it can be useful to use an owner's manual or digital source (e.g., a tablet, computer, etc) for referencing a guide on how to repair a vehicle system, the user ultimately needs to work with the system with their hands at some point, which requires focus on the system and not the information source. Often times, for novice users, merely finding the actual vehicle component to be addressed is a source of difficulty. For advanced users who may know where the component is located, manufacturer recommended maintenance procedures may still be unknown.

While the illustrative examples are presented with respect to tools and wearable devices, any wirelessly detectable device can be used as described in the examples. Moreover, even a robotic system could be guided and configured as described herein, which may be useful, for example, if a dealership includes a service robot that does not have a fixed frame of reference relative to a vehicle (e.g., it does not know exactly where each vehicle element is located relative to itself. If sufficiently pinpointed 3-D reference coordinates can be established through triangulation, any device can be guided by instruction around known obstacles that exist at known locations within the 3D reference frame. Such obstacles can be used as reference points for guiding a human as well, and can even be used for calibration.

The illustrative embodiments utilize 3 (or more) beacons deployed at fixed locations around a vehicle chassis. These can be removable or installed at fixed locations. In one example, there will be instructions to install the beacons at specific points, but a 3D coordinate reference frame can also be established by installing the beacons at various points, and having the user, wearing a connected device, touch various fixed elements. Since the make and model can be known, the fixed element location (e.g., driver's side front door handle) is also known relative to the vehicle layout, and the signal strength from (or detected by) the wearable device at that location can be used to determine the relative positions of the beacons. This may work better if the driver touches several fixed locations—e.g., after deploying the beacons, the driver could be asked to walk around the vehicle and hold each door handle until the device haptically feeds-back.

Other methods of signal triangulation can also be used, and the beacons can be configured to send signals that can be received and processed by an application on the device that allows for triangulation, or the beacons can receive a device signal and send the signal strength to a processor for device-location calculation. Thus, the beacons can be transmitters, receivers or transceivers.

Because the device location can be determined based on signal triangulation, and because the location of most vehicle elements is fixed within a 3-D reference frame for that make and model, knowing the 3-D location of the device allows a processing system to know what elements are proximate to the device. This allows the system to guide the user to a desired element, alert the user when the device is near the element (or any relevant element) and even alert the user when the device is near a dangerous element such as a heated vehicle element or electrical hazard.

In a similar manner, wirelessly connected tools can be guided to the elements they are intended to service, and can even be wirelessly configured—e.g., torque settings can be sent to a device that is intended to tighten a bolt, or a screw, so that the device does not over tighten the fastener. This allows even a novice user to use a complex tool without having to specifically know how to configure the tool, and can avoid inadvertent damage. At the same time, professional mechanics can have some assurances that they are not going to accidentally strip or overtighten a fastener, or break a piece of the vehicle, when they are using a configurable tool to work on a vehicle with which they are not intimately familiar.

FIG. 1A shows an illustrative example of a vehicle 100 including a variety of illustrative systems, beacon deployment, and several illustrative wirelessly connected devices. In this example, user arm 101 wearing a wearable 103 device and a wirelessly connected tool 105 are shown as objects that may be freely moved within a vehicle 100 3D coordinate system. Either the device can receive signals from the beacons 107, 109, 111 or the beacons can receive a signal from the device 103, 105. In either event, the receiving entity may have internal or external (e.g., through connection to another device, such as the vehicle for the beacons or a computer or cloud server for the devices) access to a database containing a vehicle layout. The strength of signals can be used to determine a 3D location of the device relative to the beacons, and since the vehicle 100 frame is fixed and the beacons are at fixed locations, the relative position of the device 103, 105 within the 3D coordinate system of the vehicle 100 can be known.

As the device moves about the 3D coordinate system, proximity to various vehicle elements can trigger responses.

For example, when the device 103 is near a battery 117 or an oil cap 119 attached to engine 121, the device can trigger haptic feedback or a haptic response can be sent to the device by trigger (depending on what entity is actually determining the device location). If the device 103 moves to close to the radiator 119 and it is hot (e.g., this can be known through sensed value, modelled value or calculated value), a warning can trigger, which can include audible alerts, alerts to a second device (e.g., a mobile phone application) or even a vehicle response through speakers or a chirp. In a similar manner, if the device is near a component, a picture of the component or a component name can be shown on a device display, another device (phone/computer display) or both. The user may be seeking a specific component in advance, or the user may move the device about freely and be notified of proximity to various vehicle 100 elements and/or proximity to alert-generating systems.

A device can also be used to guide a user to a specific component through audible or visual alerts. Instructions can be issued from the device (e.g., move hand 1 foot forward towards windshield and to the right) or an arrow or compass-like guide can show the user a next-direction. With such a display, the user could align a hand outside of the vehicle with a component in the interior, and then move in a straight line guided by the arrow, knowing that alerts would be issued if there was a chance of encountering a dangerous system. Since the vehicle 100 may know of alert state systems in advance, the arrow may be green if the path from the current location to the element is clear and red if a new approach vector should be taken. These and other examples are illustrative in nature and not intended to limit the embodiments thereto.

Similarly, a tool 105 may be used to adjust various vehicle elements. The tool may provide or receive a detectable signal for triangulation and may be connected to an external database. When the tool is near an element, such as rear-view mirror 113, the torque and other settings may be correctly set. If the tool has interchangeable bits, a display (on the tool or remote) can indicate which bit is to be used in conjunction with a fastener, for example, which may be useful if the fastener is deep within a recess and cannot clearly be seen.

In still another example, if a user experiences a flat tire 127, the user may have no idea how to use, or even find, the jack and lug wrench. The user could indicate to the vehicle 100 that they are seeking to change the tire, or the vehicle 100 could detect the flat-state through a tire pressure monitoring system and give the user a selectable option for engaging instructions.

The vehicle 100 could pop the trunk, and guide the user through beacon placement if the beacons were not already deployed. If this aspect is used, the correlation of beacons to locations through placement of the user's hand and device 103 at fixed locations, as discussed above, can be used to calibrate beacon placement to a known vehicle frame.

Once the coordinate system is established and the beacons are in place and/or enabled, the user can be guided to the trunk space through verbal, haptic or visual instruction, and moving the hand and device 103 within the trunk 123 can result in feedback when the user is near jack-storage 125. Again, instructions on how to remove the jack can be provided if desired. If the vehicle has speakers adjacent the trunk or an open cabin design (e.g., an SUV) the instructions can even be audibly provided by the vehicle, which can be capable of knowing where the device 103 is located based on direct connection to the device or beacons.

The user can remove the jack (not shown) and move to the tire 127, at which point the device location can be used to guide the hand 101 to each lug nut, a jack placement point, etc. If the user places the jack but does not elevate the jack, an alert can issue. Similarly, if the user over-elevates the jack, an alert can issue. In this manner, the user can be intuitively and/or directly guided through a step by step process with no prior knowledge.

Figure 1B:
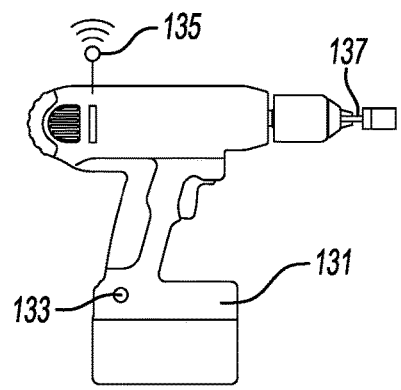
FIG. 1B shows an illustrative example of a wirelessly connectable tool.

FIG. 1B shows an illustrative example of a wirelessly connectable tool. In this example, the tool 131 includes a pairing button 133 that allows pairing of the tool 131 with the beacons 107, 109, 111. Once paired, the device 131 can broadcast or receive a signal 135, which can be processed by another connected device (computer), the vehicle 100, or the device 131 itself. Thus, the location of the device 131 within the 3D vehicle coordinate system is known, and when the device 131 is near an element adjustable with the device 131, or a pre-specified element intended to be adjusted, the torque or other aspect of the drive arm 137 can be automatically set to the requirement or recommended setting for the proximate element. The device may also include accelerometers and other elements usable to detect orientation of the device, so that if a variety of adjustable fasteners are proximate, the orientation of the device can serve as a secondary data point. Data about settings, bits and the 3D coordinate system for a given vehicle 100 can be stored in a database provided by the manufacturer of the vehicle 100 and accessible by the device or a device-assisting computer.

Figure 1C:
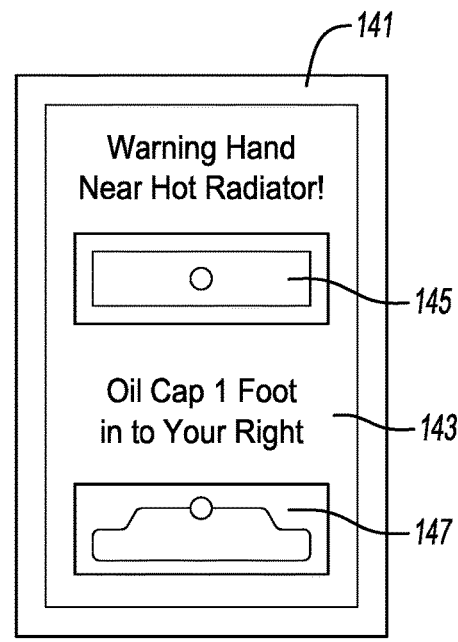
FIG. 1C shows an illustrative example of a mobile device.

FIG. 1C shows an illustrative example of a mobile device 141. This device 141 is a smart phone, but any device that is wirelessly connectable to either the movable device 103, 105 or a backend connected to the moveable device 103, 105, and which has a display, can be used in this manner. In some instances, the moveable device 103, 105 itself may include such a display.

In this instance, the user's hand 101 is too close to a hot radiator 119 and the device 141 issues a visual and audible alert 143. Further, the device 141 may display a picture of the radiator, so the user knows what to avoid.

Also, the user may have previously indicated, using the device 141, for example, or an in-vehicle display, that the user wants to add oil to the vehicle. Since the target of the user's inquiry is known, the device 141 may provide guidance as well in the form of text or audible instructions 149, as well as a picture of the relevant system, in this case, the oil cap 147 attached to the engine.

Working as discrete elements or in conjunction, these and similar illustrative embodiments can serve to greatly improve the user experience when seeking to service a vehicle 100, whether the user is an amateur or skilled mechanic. These embodiments can also be used in training personnel, who can become familiar with repair procedures based on planned and guided repair strategies.

Figure 2:
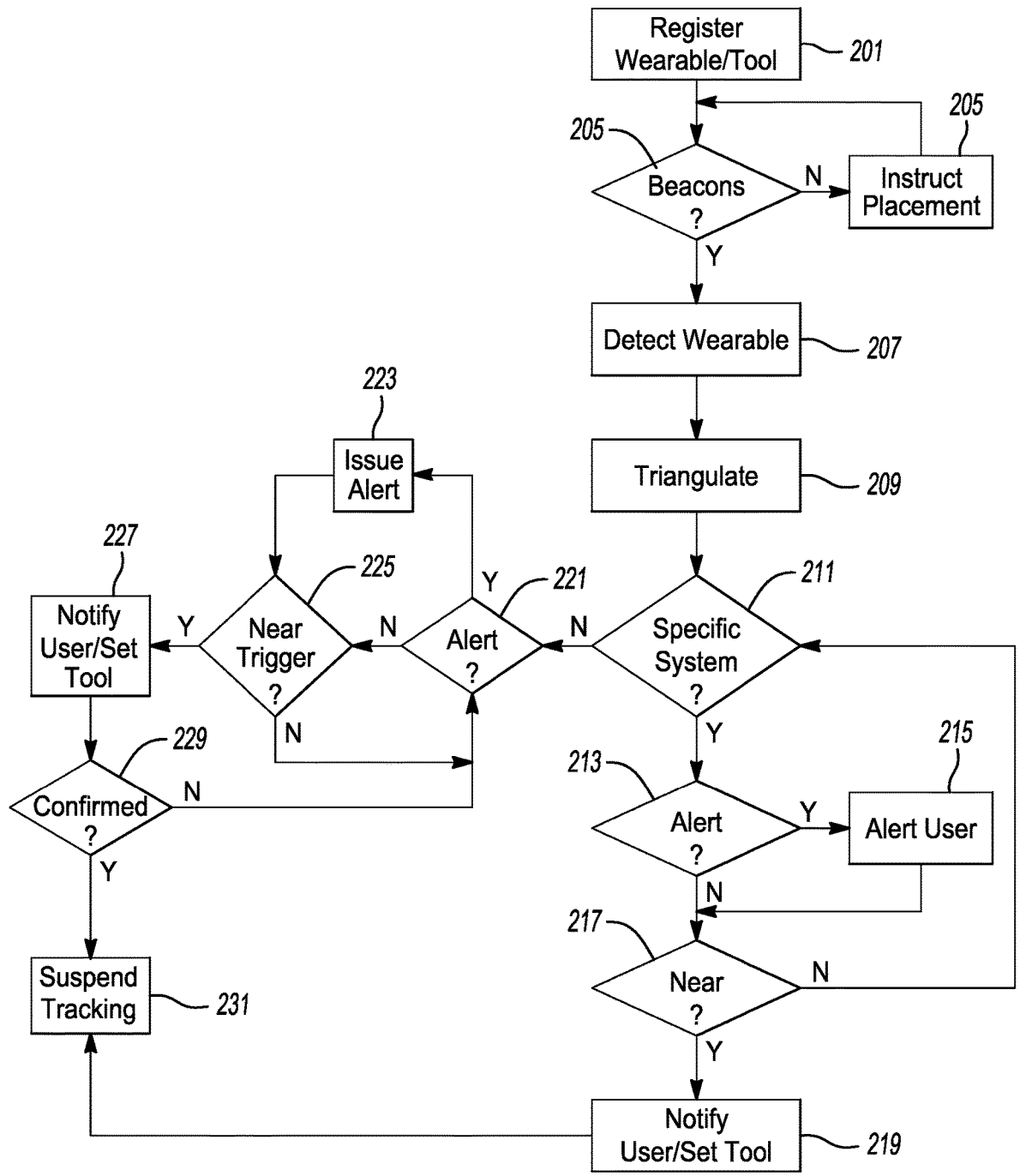
FIG. 2 shows an illustrative example of a tool or device tracking and management process.

FIG. 2 shows an illustrative example of a tool or device tracking and management process. In this example, the process registers or pairs with a wireless device such as a wearable or tool at 201. This allows the beacons to discern the device signal of interest or the device to identify the beacon signals. In another example, the beacons may send out a detectable signal which may be detectable and measurable without requiring explicit pairing.

Once the registration, detection or pairing request is made/received, the process determines if beacons are presently deployed and active at 203. In some instances, the beacons may be integrated into the vehicle 100, in other instances they may be deployable or even sold as an aftermarket product, allowing retro-fit of any vehicle 100 without requiring mechanical or electrical modification, if they have their own power supplies. Magnetic or other mechanical fastening, such as hook-and-loop, can be used to secure the beacons in locations instructed at 205. If the vehicle 100 lacks a computer that can pair with the beacons, and the beacons lack onboard processing but are configured to receive a device signal, then a secondary computer or phone 141 may be used as the processor for the signal. The device 103 itself could have a data connection with the beacons, and receive feedback from the beacons as to the strength of a received signal from the device 103, allowing the device to self-locate within the reference system.

Once signal strength is established and relevant signals are received by a receiving entity at 207, a processor can determine the location of the device at 209, via triangulation, for example. As the device 103 moves around the vehicle interior, the location updates so the present location of the device 103 may always be known, or at least within a margin of error. Signal loss for certain locations in the vehicle, at least as a result of fixed vehicle elements, may also be known and accommodated, and beacon location may be instructed as a partial function of where the user intends to work on the vehicle, to the extent that the user indicates this in advance.

If the user specifies a system in advance at 211—e.g., the user requests assistance changing oil or the vehicle 100 detects a flat tire, then one or more specific targets may be known. For example, in the oil example, the user may need to locate the hood-latch first, disengage the latch, then locate the oil cap. In the tire example, the user may need to find the jack, remove it, find a jack-point, place the jack, and then locate the lug-nuts. Since the device 103 can inform whatever processing element that is guiding the movement when the device is proximate to a location, some degree of certainty that a next-step is appropriate can be assured, even if the vehicle 100 cannot actually detect that a jack has been removed or that a lug-nut has been unscrewed.

As the user moves through the process to reach the given system, if there is an alert based on proximity to a risky system at 213, the process can issue an alert at 215. This can include a visual, haptic or audible alert, through both the device and one or more additional systems. If the alerting processor knows that an element is dangerous (e.g., a vehicle has been running for 2 hours and the radiator is hot), then the alert may be issued with some degree of specificity. Otherwise, a generalized alert about the system, e.g., "radiator nearby, may be hot, please avoid contact with skin" can be issued. In examples where there is visual guidance on a display, such as an arrow, the arrow can turn red or even change form when the user is near a dangerous system and/or there is a dangerous system between a current device 103 location and an intended element 119 location.

Once the device 103 is proximate to the intended or next-step system at 217, the process can notify the user and/or configure a tool if appropriate at 219. If this is the last step in the process, the process may suspend tracking until a new request is issued, or at least suspend alerting at 231.

If no target was specified at 211, the user can operate in a sand-box mode, where the process can track locations and alert the user at 221 if various elements are nearby. In this example, the decision at 221 is with regards to an alert at 223 about a dangerous element, and if there is a trigger element (a serviceable or element-of-interest) nearby at 225, the process may notify the user and/or configure a tool at 227.

The user may also notify the system (e.g., through a button press) that the desired system has been reached at 229, and this may suspend tracking or configuration at 231. This can avoid inadvertent reconfiguration of a tool, for example, if the user moves the tool around while adjusting the system and moves it proximate to a new adjustable system.

Figure 3:
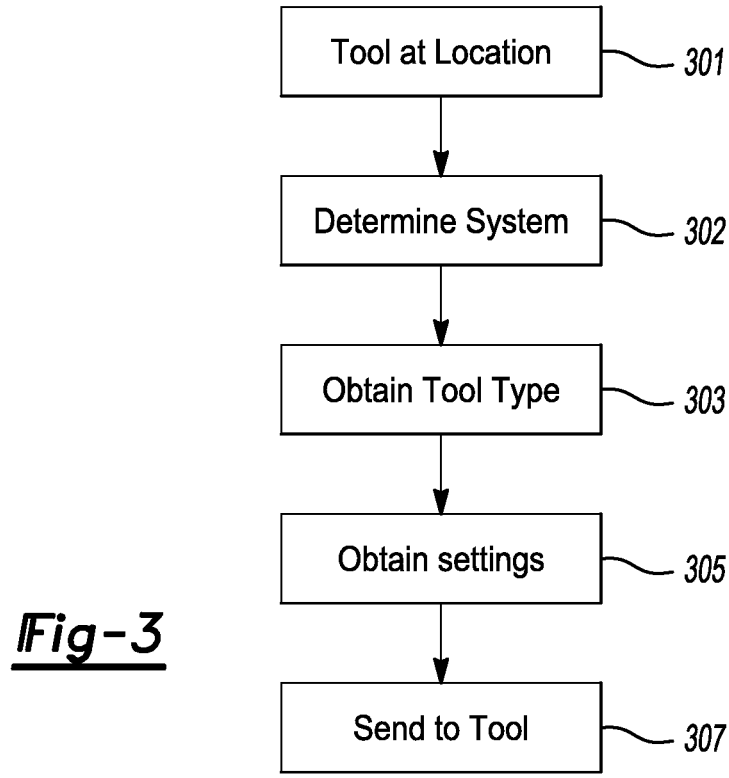
FIG. 3 shows an illustrative example of a tool configuration process.

FIG. 3 shows an illustrative example of a tool configuration process. In this example, a process onboard the tool or working in conjunction with the tool determines the location of the tool relative to adjustable systems, and determines any calibration for the tool recommended based on the system.

For example, a database of a vehicle may indicate the fastener types, bit sizes and torque adjustments for an electric driver that may be used to fasten or unfasten various connections. The process determines that the tool 105 is proximate to such an element or fastener, using tool-orientation as needed to, if the tool includes accelerometers or other devices allowing for orientation detection.

Once the process determines the tool is near a system or target system at 302, if a target was pre-specified, the process may obtain a tool type at 303 if the type is not already known. This may inform the process as to what settings can be adjusted at 305 and how they can be adjusted, and what bits or heads are attachable or available.

Configuration information may be sent to the tool at 307 or to a computer if the tool needs to be manually configured. Bit change information may be also sent to the computer, and in some instances, the tool 105 may be prevented from operation until the user confirms the correct bit is installed, for example to prevent stripping of a small screw in a deep recess by installation of an undersized bit.

Figure 4:
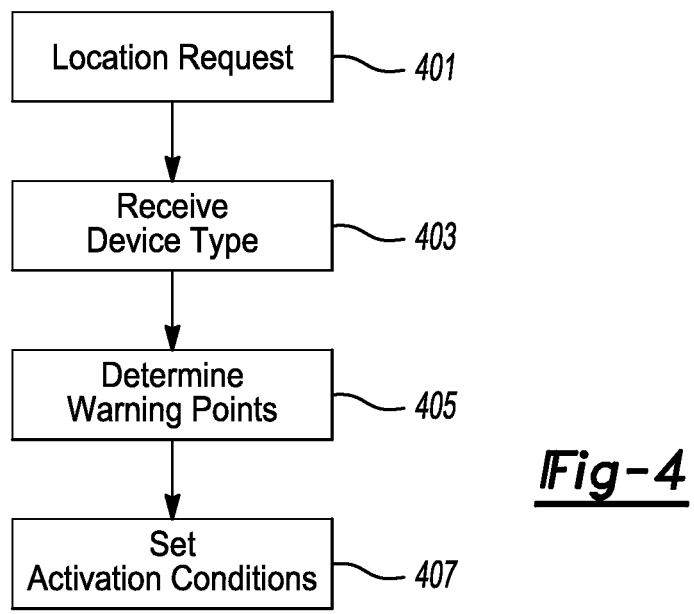
FIG. 4 shows an illustrative example of a device tracking configuration process.

FIG. 4 shows an illustrative example of a device tracking configuration process. In this example, the user may request a specific element to be accessed or identified at 401. This could be done through a device interface or through a vehicle 100 interface. In other examples, the vehicle may detect a system issue and provide the user with an identified system, or tell the user that the system has been loaded for detection.

The user can then connect a device or identify a device to be tracked (e.g., wearable, cell phone, etc) and that is the device whose location will be tracked. Haptic feedback can be sent to (or provided by) that device, and alerts can be provided to or in conjunction with the device.

A device type may also be received at 403, which lets the process know what alert and display capabilities the device has. This may also cause one or more alerts to be sent to the device to instruct the user as to where to go and whether, for example, a device as large as a cell phone can fit proximate to a buried system in a crowded portion of an engine compartment, for example.

The process may also determine warning points at 407, which can include any systems known to be currently in a dangerous (e.g., hot, electrical, chemically dangerous, etc.) state and/or systems that may be dangerous and which exist between an ingress and the desired system. For example, the radiator 115 is between the front of the vehicle (where a user will stand to open the hood) and the target oil cap 119. Accordingly, the process may direct the user to open the hood but then to approach from a vector that doesn't intersect the radiator 115, or use a high approach line to avoid skin contact. Activation coordinates for warnings can be set, and since the device 103 can be located in 3-D space, these can have a height-related aspect as well, so that if an approach to the component is passing over the radiator 115, the system can determine if there is likely to be contact and instruct a higher approach if this is the case.

Figure 5:
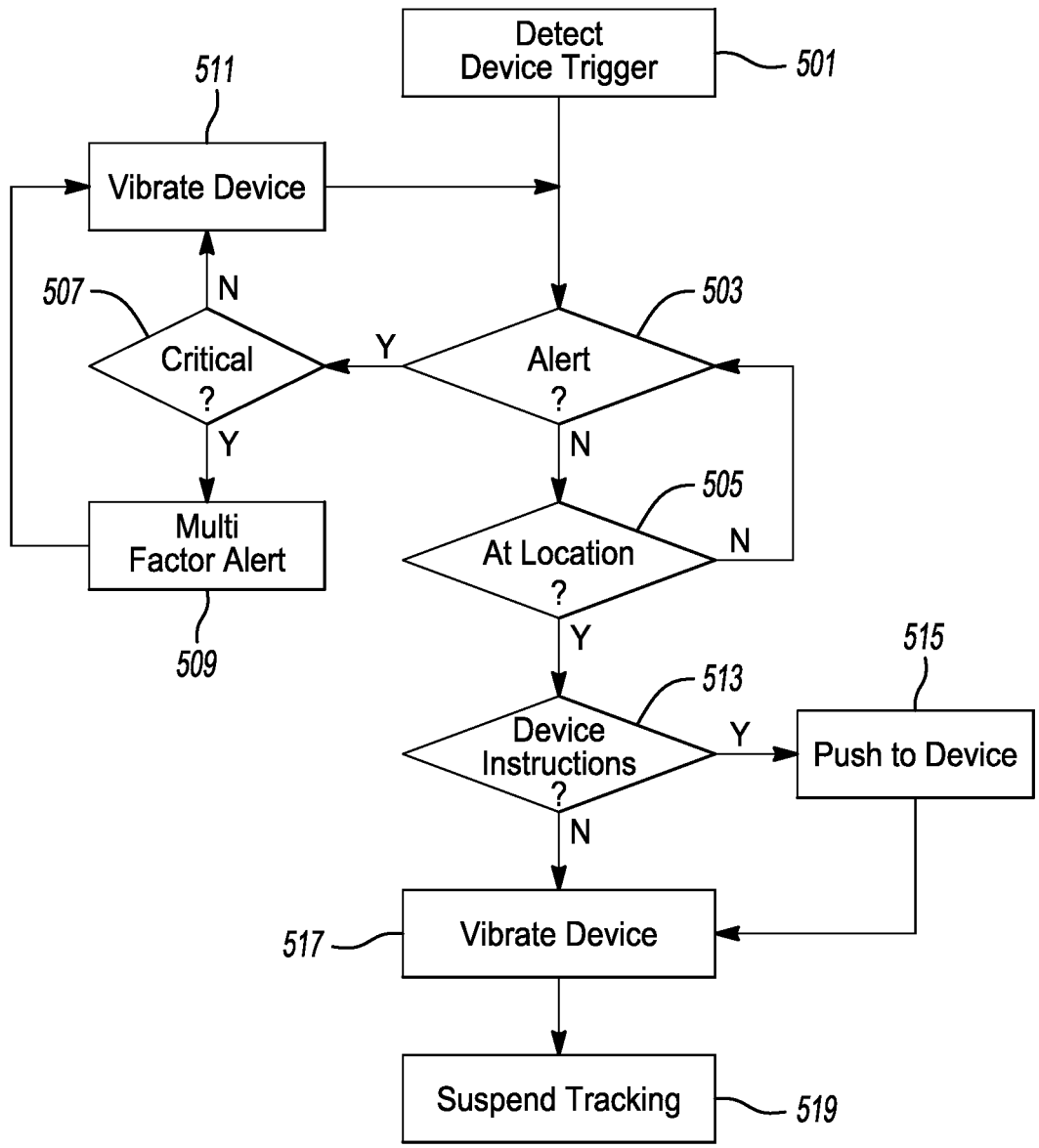
FIG. 5 shows an illustrative example of a device tracking and assistance process.

FIG. 5 shows an illustrative example of a device tracking and assistance process. The process tracks the movement of a device 103, 105 through 3D coordinate space of the vehicle reference frame, determining when the device location is near any fixed trigger point locations. If the device coordinates are near trigger coordinates (e.g., coordinates associated with an adjustable system, an of-interest system, a next-step location or system, a caution-system, etc.), the process determines if this is an alert-worthy system at 503. Alert-worthy systems in this context are systems warranting an alert response that may be more aggressive than haptic or standard feedback, so the user knows that while the desired location has not been reached, something worth noting is nearby, typically in the context of something to avoid touching or contacting. Other alerts can include a location in conjunction with a vehicle event, e.g., a jack location and the vehicle event of the vehicle detecting excessive pitch or roll, possibly indicating the jack being used too aggressively and raised too high.

If there is no alert for an alert-worthy system, the process determines if the device 103 is at a defined location (e.g., a requested part) at 505 or if the device is still moving. While the device is moving, if there is ever an alert state triggered at 503, based on, for example, proximity to an alert-worthy system, the process also determines if the alert is critical (e.g., high chance of injury, system known to be in certain state, low chance of injury but risk of extreme injury, etc.). If there is a critical alert at 507, the process may send a multi-factor alert at 509. This can include, for example, one or more alerts issued by the vehicle 100, alerts issued by multiple devices, etc. If the alert is low-criticality (e.g., you may scrape your hand on something sharp) then the process may merely alert the moving device such as a watch or phone, causing haptic, audible or visual feedback. Alternatively, all alerts may be treated as critical, or the driver can set certain alerts as critical and certain as common.

Once the device is at a relevant location or a requested location at 505, the process determines if there are instructions for the device at 513. This can include, for example, configuration instructions for configuring tool settings, or instructions to be output to a display or audibly based on what part the device is near and/or what step in a multi-step process a current-location represents (e.g., if the user is at the trunk and the device is near the jack storage, the device may audibly say—unscrew the nut to your left to release the jack).

At the same time, the process may send instructions for the device to vibrate or otherwise indicate the location at 517 and suspend tracking at 519. Suspending tracking may simply be suspension of alerts, while tracking remains active. Knowing where the device is located may be useful and when the device moves more than a threshold away from a defined location (e.g., a current part or a current step) the system may resume alerts. The device may have to be moved more than a threshold distance for more than a threshold time period as well, to account for the user momentarily extracting a hand, for example. Alerts for the immediate location, and caution alerts, may not be suspended regardless, so even if the user withdraws a hand for a second, the user will still receive caution alerts when re-placing the hand and will still get the feedback when the current relevant location is reached.

Feedback and control can also be vehicle-based, e.g., a light or system could respond when the wearable was near an element of interest, or, for example, a hand in a glove-box could turn on the glove-box light, and a hand in an engine could turn on an engine illumination light. Broad form (e.g., whole engine lighting) or localized responses could be used, depending, for example, whether the response of the vehicle system was intended to provide feedback or general convenience.

Through use of the illustrative embodiments and the like, it is possible to provide guided user assistance to novice users, amateur and professional mechanics, and anyone else interested in finding vehicle elements or attempting service. These alerts can be on-demand or responsive to a failed system state, and the overall impact of such concepts should greatly improve the servicing of vehicles in terms of both time and accuracy. In the tool-based embodiments, automatically adjusting a tool setting and/or preventing rotation until a bit is confirmed, if either is desired or implemented, can prevent inadvertent damage to fasteners and other small parts.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
at least processor enabled to:
receive data indicating signal strength of signals transmitted between a plurality of beacons and a mobile device;
determine a location of the mobile device within a vehicle coordinate system, wherein the beacons have known locations within the coordinate system, the determination based in part on the signal strength;
determine that the location of the mobile device is proximate to a predefined vehicle element location; and
instruct issuance of at least one of an audible, visual or haptic alert, from the mobile device, responsive to the proximity.

2. The system of claim 1, wherein the data is received from the mobile device and indicates the signal strength as detected by the mobile device for signals received by the mobile device from the beacons.

3. The system of claim 1, wherein the data is received from the beacons and indicates the signal strength as detected by the beacons for signals received by the beacons from the mobile device.

4. The system of claim 1, wherein the vehicle element includes an element designated for causing an alert.

5. The system of claim 4, wherein the vehicle element includes an adjustable element.

6. The system of claim 1, wherein the vehicle element includes an element identified by an input received by the processor, identifying the element.

7. The system of claim 1, wherein the instruction for the issuance of the alert is also to a device other than the mobile device.

8. The system of claim 1, wherein the processor is further enabled to instruct configuration of a tool setting, at least when the mobile device is a reconfigurable tool.

9. The system of claim 1, wherein the processor is further enabled to instruct display of information related to the vehicle element that is located at the vehicle element location.

10. The system of claim 9, wherein the information includes at least one of usage instructions or adjustment instructions for the vehicle element.

11. A method comprising:
receiving data indicating signal strength of signals transmitted between a plurality of beacons, deployed to a vehicle, and a mobile device;
determining a location of the mobile device within a vehicle coordinate system of the vehicle, wherein the beacons have known locations within the coordinate system, the determination based in part on the signal strength;
determining that the location of the mobile device is proximate to a predefined location of a vehicle element of the vehicle; and
instructing issuance of an audible alert, from the vehicle, responsive to the proximity.

12. The method of claim 11, wherein the data is received from the mobile device and indicates the signal strength as detected by the mobile device for signals received by the mobile device from the beacons.

13. The method of claim 11, wherein the data is received from the beacons and indicates the signal strength as detected by the beacons for signals received by the beacons from the mobile device.

14. The method of claim 11, wherein the vehicle element includes an element designated for causing an alert.

15. The method of claim 11, further comprising instructing configuration of a tool setting, at least when the mobile device is a reconfigurable tool.

16. A non-transitory computer-readable storage medium storing instructions that, when executed by at least one processor, enable the at least one processor to:
determine a location of the mobile device within a vehicle coordinate system, wherein the beacons have known locations within the coordinate system, the determination based in part on a signal strength indicated by received data indicating signal strength of signals transmitted between a plurality of beacons and a mobile device;
determine that the location of the mobile device is proximate to a predefined vehicle element location;
instruct issuance of an alert responsive to the proximity; and instruct configuration of a tool setting, at least when the mobile device is a reconfigurable tool.

* * * * *